United States Patent [19]

Hanai

[11] Patent Number: 5,317,858
[45] Date of Patent: Jun. 7, 1994

[54] BAG FORMING/FILLING SYSTEM

[75] Inventor: Kuniyoshi Hanai, Chiba, Japan

[73] Assignee: Tokyo Automatic Machinery Works, Ltd., Tokyo, Japan

[21] Appl. No.: 852,018

[22] Filed: Mar. 16, 1992

[30] Foreign Application Priority Data

Jul. 30, 1991 [JP] Japan ................................ 3-190029
Nov. 8, 1991 [JP] Japan ................................ 3-293359

[51] Int. Cl.$^5$ .................................................. B65B 9/22
[52] U.S. Cl. ..................................... 53/451; 53/389.2; 53/551
[58] Field of Search ................... 53/389.2, 389.4, 451, 53/551, 552, 550, 450

[56] References Cited

U.S. PATENT DOCUMENTS

| | | | |
|---|---|---|---|
| 2,931,149 | 4/1960 | Mitchell | 53/451 |
| 2,955,398 | 10/1960 | Dreeben | 53/389.2 X |
| 3,061,989 | 11/1962 | Newell et al. | 53/389.2 X |
| 3,067,553 | 12/1962 | Rivman et al. | 53/550 X |
| 3,526,079 | 9/1970 | Maxeiner et al. | 53/551 |
| 4,127,976 | 12/1978 | Jablonski et al. | 53/551 |
| 4,262,474 | 4/1981 | Reuter et al. | 53/551 |
| 4,353,196 | 10/1982 | Beer et al. | 53/552 X |
| 4,423,585 | 1/1984 | Monsees et al. | 53/451 |
| 4,501,109 | 2/1985 | Monsees | 53/551 X |
| 4,512,138 | 4/1985 | Greenawalt | 53/451 X |
| 4,517,790 | 5/1985 | Kreager | 53/451 X |
| 4,608,797 | 9/1986 | Shabram, Jr. et al. | 53/550 X |
| 4,754,593 | 7/1988 | Ishihara et al. | 53/551 X |

FOREIGN PATENT DOCUMENTS

| | | |
|---|---|---|
| 62-158629 | 7/1987 | Japan . |
| 62-158630 | 7/1987 | Japan . |
| 0683766 | 12/1952 | United Kingdom . |
| 1393711 | 5/1975 | United Kingdom . |
| 1446945 | 8/1976 | United Kingdom . |
| 1452219 | 10/1976 | United Kingdom . |
| 1469844 | 4/1977 | United Kingdom . |

Primary Examiner—John Sipos
Assistant Examiner—Daniel Moon
Attorney, Agent, or Firm—Sandler, Greenblum & Bernstein

[57] ABSTRACT

A bag forming/filling system includes a delivery mechanism to feed a predetermined length of web material from a web roll to a bag forming cylinder, in which the web is sealed by a sealing machine to form a bag. A predelivery mechanism unwinds and loosens a portion of the web from the web roll by a length substantially corresponding to the predetermined length before operation of the delivery mechanism. The predelivery mechanism may include a pivotally movable tension lever, which moves in an unwinding direction substantially during the closing motion of the sealing machine. In a second embodiment, the predelivery mechanism includes a drive element for rotating the web roll and a detector for detecting a slackened length of a portion of the web.

7 Claims, 6 Drawing Sheets

BAG FORMING/FILLING SYSTEM

BACKGROUND OF THE INVENTION

1. Field of the Invention

The present invention relates to a bag forming/filling system wherein a web from a web roll is allowed to hang down while being formed around a bag forming cylinder into a tubular shape by intermittent operation of a delivery portion, or mechanism which is located at an opposed position to an outer surface of the bag forming cylinder. The web is then sealed in a transverse direction by a closing motion of a transverse sealing machine to form a bag. The interior of the bag is then filled with material to be packed.

2. Description of Background and Relevant Information

A known bag forming/filling system is disclosed, for example, in Japanese Patent Laid-Open Application No. 158630/87. According to this conventional bag forming/filling system, a predelivery mechanism, which includes a predelivery roller and a tension lever, is pivotally positioned on a downstream side of the predelivery roller in a delivery path extending from a web roll up to a bag forming cylinder. A web is passed onto both of a plurality of rotatable tension rollers which are journalled to the tension lever and onto a plurality of guide rollers disposed in an opposed relation to those tension rollers, so that constant tension is applied to the web by the weight of the tension lever and the tension rollers. Furthermore, two delivery belts, which act as delivery portions, are disposed on the outer peripheral portions and on both opposed sides of the bag forming cylinder so as to be in abutment with both transverse side portions of the web. Both delivery belts are adapted to perform an intermittent operation, whereby the web is delivered intermittently by a predetermined length at a time. Pivotal movement of the tension lever is detected by a detector and the predelivery roller is rotated, whereby the web is pulled out from the web roll and the tension lever is brought back into its initial position, so that the force of pulling out the web from the web roll is diminished and the web is kept under tension.

In such a known bag forming/filling system, however, since the web is delivered intermittently by the delivery portions while being kept under constant tension, the delivery resistance of the web is high, and unless the delivery force of each delivery portion is large, it is impossible to ensure the intermittent delivery of the web, thus resulting in increase of the cost. In the event a force is generated which is in a transverse direction relative to the delivery direction of the web being delivered, for example due to a defective setting of the web roll or a dimensional error of the web itself, a positional deviation of the web will occur, and the web will easily move over side guides which project therefrom with the result that the product obtained is defective.

The two delivery belts operate at the same speed to intermittently deliver both transverse side portions of the web by the same length at a time. If a difference in frictional resistance occurs between both delivery belts, which are in abutment with both transverse side portions of the web, due to a minor problem (for example, a surface stain on one delivery belt or the difference in quality between the two belts), one delivery belt will slip with respect to one side portion of the web. Accordingly, the other side portion of the web is forcibly pulled by only the other deliver belt, resulting in the web being skewed in the transverse direction, and the delivery resistance of the other web side portion being forcibly delivered increases, so that the other delivery belt, which is in abutment therewith easily slips. Repetition of such slippage results in meandering of the web and defective products.

To lower the occurrence of such defects stopping the operation and re-adjustment at every start of the transverse movement of the web are required, but this is not only troublesome but also lowers the operating efficiency.

Further, since it is necessary to provide a drive source for the predelivery mechanism which is separate from the drive source for the delivery belts and the transverse sealing machine, the structure is complicated and the cost becomes high.

SUMMARY OF THE INVENTION

The present invention has been formed to solve such known problems, and it is an object of the invention to intermittently deliver a web with low tension of such web. It is another object of the invention to effect the delivery of a web without alternate slipping of both transverse side portions of the web.

The present invention solves the above-mentioned problems by using a predelivery mechanism for taking out and loosening a web from a web roll by a length substantially corresponding to a delivery length by a delivery mechanism before start of an intermittent operation of the delivery mechanism. The predelivery mechanism is in a delivery path extending from the web roll to a bag forming cylinder.

Preferably, the predelivery mechanism includes a pivotable tension lever which operates in conjunction with a transverse sealing machine, and preferably at the time of a closing motion of the transverse sealing machine. The tension lever is pivotally moved in a web stretching direction and the web roll is rotated in a pull-out direction in steps by a predetermined amount, while at the time of an opening motion of the transverse sealing machine, the tension lever is pivotally moved in the direction opposite to the web stretching direction to loosen the web pulled out from the web roll. A brake for stopping the rotation of the web roll operates in conjunction with the transverse sealing machine and it is operated only at the end of the closing motion of the transverse sealing machine.

The predelivery mechanism may include a drive portion for rotating the web roll in an unwinding direction and a detector for detecting the slack length of the web in the delivery path. The operation of the drive portion is controlled in response to an output provided from the detector to thereby maintain the slack length of the web at a predetermined length. Preferably, a web rewinding preventing portion for preventing the rewinding of the web unwound from the web roll is provided near the web roll.

The present invention is further characterized in that one delivery portion is in abutment with a transversely central part of the web.

In the operation of the present invention, as the predelivery mechanism operates, the web in the delivery path is loosened by a length substantially corresponding to the delivery length of the delivery portion at the time of start of the intermittent operation of the delivery portion, and this loosened web is delivered to the bag forming cylinder by the subsequent intermittent operation of the delivery portion.

Since the transversely central part of the web is delivered by one delivery portion, both transverse side portions of the web are delivered equally in an essentially non-contact manner.

The present invention is directed to a bag forming/filling system, wherein a predetermined length of web fed from a web roll is fed by a delivery mechanism to a bag forming cylinder, in which the web is sealed by a sealing machine to form a bag. The bag forming/filling system includes a predelivery mechanism for unwinding and loosening a portion of the web from the web roll by a length substantially corresponding to the predetermined length of web fed from the web roll by the delivery mechanism. The predelivery mechanism unwinds the portion of the web before operation of the delivery mechanism. The delivery mechanism is located oppositely to the bag forming cylinder and is intermittently operable to feed the predetermined length of web from the web roll.

The web is sealed by a closing motion of the sealing machine, and the predelivery mechanism includes a pivotally movable tension lever. The tension lever is pivotally movable in a web unwinding direction to place a portion of the web under tension and to rotate the web roll in an unwinding direction at substantially the same time as the closing motion of the sealing machine. The tension lever is also pivotally movable in a direction opposite to the unwinding direction to loosen the portion of the web substantially during an opening motion of the sealing machine. That is, the tension lever is operably connected to the sealing machine, wherein the tension lever is pivotally movable upon the opening and closing motions of the sealing machine.

According to another aspect of the invention, a brake stops rotation of the web roll. The brake is operably connected to the sealing machine, whereby the brake stops rotation of the web roll when the closing motion of the sealing machine is completed.

According to another aspect of the invention, a web rewinding preventing element prevents rewinding of the web unwound from the web roll. The web rewinding preventing element may include a plate having one portion adapted to abut an outer peripheral surface of the web roll. The plate includes means, such as a weight, for urging the one portion into abutment with the outer surface of the web roll.

According to a further aspect of the invention, a guide bar is located in a delivery path between the predelivery mechanism and the bag forming cylinder, and a weight adapted to rest on the guide bar. The weight and guide bar impart a predetermined tension to a portion of the web on the downstream side of the guide bar.

A web bending element is located in a delivery path between the predelivery mechanism and the bag forming cylinder for strengthening the web. The web element includes guide means for contacting both transverse side edges of the web.

According to another embodiment of the invention, the predelivery mechanism includes a drive means for rotating the web roll in an unwinding direction, and a detector for detecting a slackened length of the portion of the web. The drive means is controlled in response to an output signal from the detector to thereby maintain the slackened length of the web at the predetermined length.

According to another aspect of the invention, the predetermined length of web fed from a web roll is fed by intermittent operation of a delivery mechanism. The bag forming/filling system includes a bag forming cylinder in which the web is sealed by a sealing machine to form a bag. The delivery mechanism is located oppositely to an outer surface of the bag forming cylinder. The web includes side edge portions and a transverse central portion, wherein the delivery mechanism contacts the transverse central portion of the web. The delivery mechanism may include an endless belt located adjacent the bag forming cylinder.

The present invention is also directed to a method for forming a bag, wherein a predetermined length of web is fed from a web roll by a delivery mechanism to a bag forming cylinder where the web is sealed by a sealing machine to form a bag. The method includes the steps of unwinding and loosening a portion of the web from the web roll by a length substantially corresponding to the predetermined length of web fed from the web roll by the delivery mechanism, and feeding the predetermined length of web by the delivery mechanism after the unwinding of the portion of the web.

The method for forming a bag also includes the steps of sealing the web by a closing motion of the sealing machine, and moving the tension lever in a web unwinding direction to place a portion of the web under tension and to rotate the web roll in an unwinding direction at substantially the same time as the closing motion of the sealing machine. The tension lever is moved in a direction opposite to the unwinding direction to loosen the portion of the web at substantially the same time as an opening motion of the sealing machine.

The method also includes the steps of stopping rotation of the web roll upon completion of the closing motion of the sealing machine, and providing a web rewinding preventing element to prevent rewinding of the web unwound from the web roll.

The second embodiment of the invention includes the steps of rotating the web roll in an unwinding direction by a drive means, and detecting a slackened length of the portion of the web and outputting a signal, and controlling the drive means in response to the output signal to thereby maintain the slackened length of the web at the predetermined length.

BRIEF DESCRIPTION OF THE DRAWINGS

The invention is further explained in the description which follows with reference to the drawings illustrating, by way of non-limiting examples, embodiments of the invention wherein.

DETAILED DESCRIPTION OF THE PREFERRED EMBODIMENTS

Figure 1:
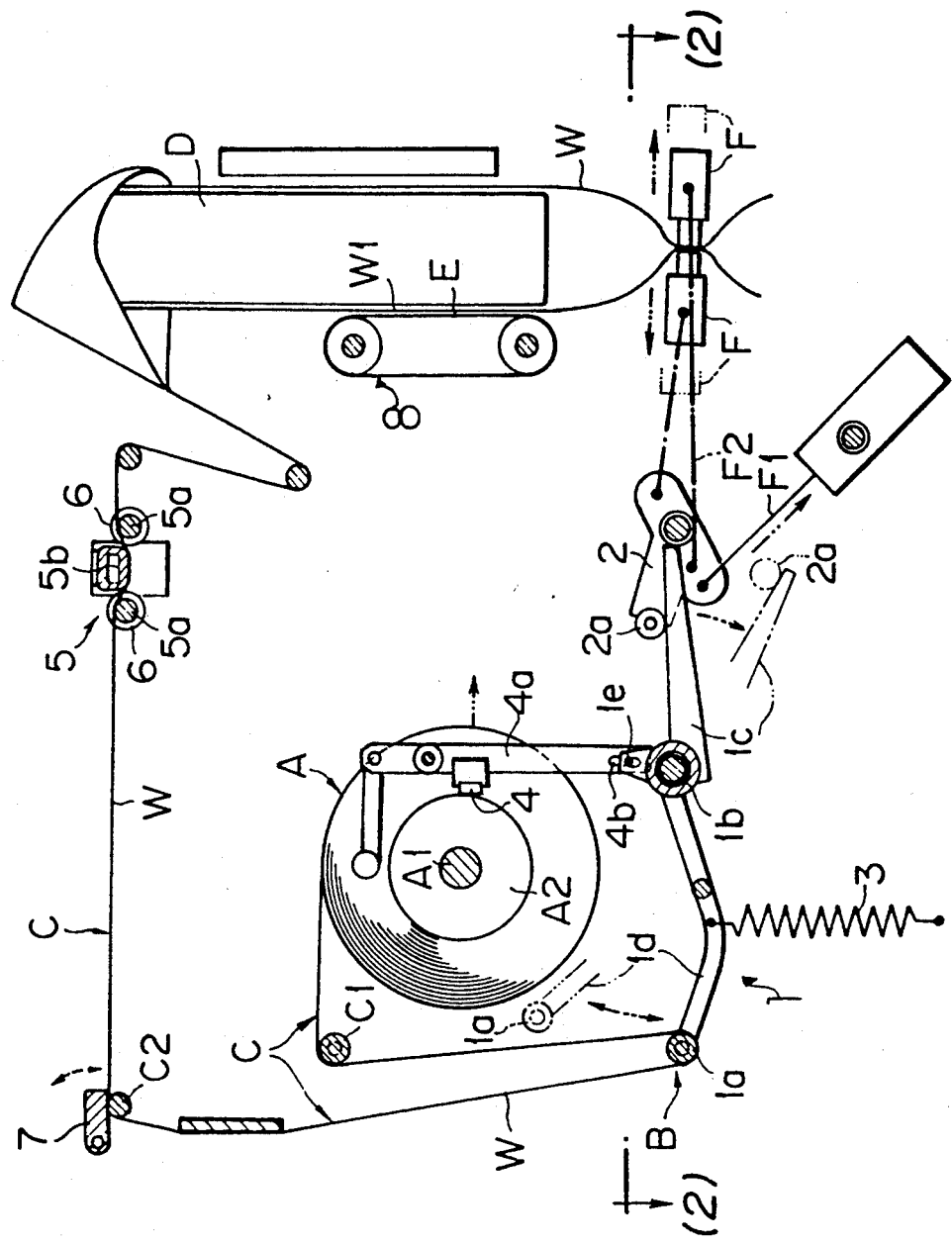
FIG. 1 is a front view in longitudinal section of a bag forming/filling system according to an embodiment of the present invention, showing completed closing motion by the transverse sealing machines.
Figure 2:
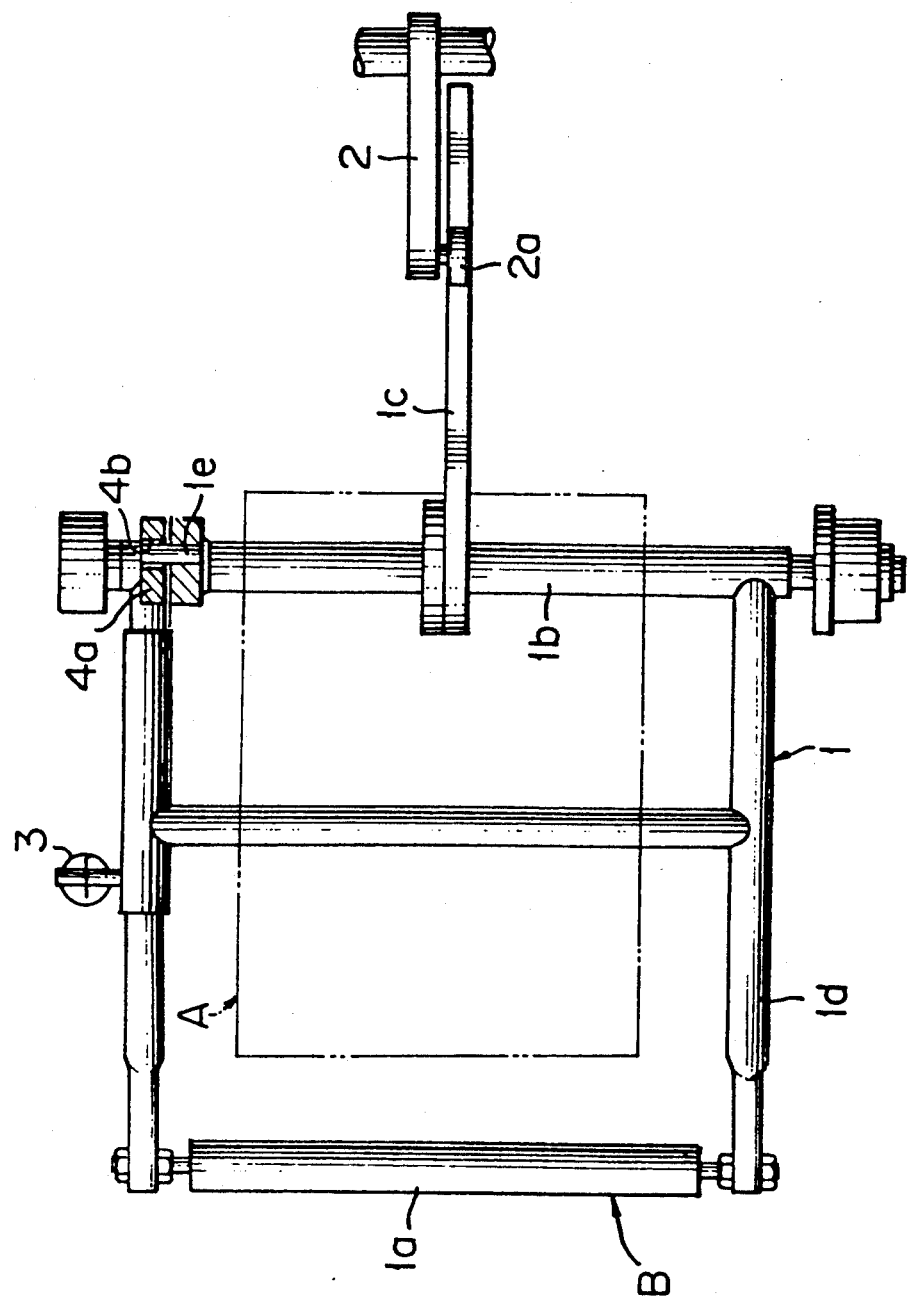
FIG. 2 is a partially enlarged plan view in transverse section taken along the line (2)—(2) in FIG. 1.

According to a first embodiment, as shown in FIG. 1, a tension lever 1 acts as a predelivery mechanism B, which is interlocked with or acts in conjunction with a pair of transverse sealing machines F, F. Tension lever 1 is disposed vertically below a web roll A and is pivotally mounted. Web W is drawn out from web roll A and passes through a guide roller C1 onto a tension roller 1a, which is positioned at a front end of the tension lever 1 below guide roller C1. The web W then passes through a guide bar C2 which is disposed above tension roller 1a, and passes horizontally toward the upper portion of a bag forming cylinder D, to thereby form a delivery path C.

Tension roller 1a is connected to tension lever 1 so as to be horizontally rotatable about a shaft, the tension roller 1a being longer than the width of web W. Tension lever 1 horizontally supports, at an intermediate part thereof, a transverse support shaft and thereby supports tension roller 1a for vertical movement. A base end side 1c of the tension lever is interlocked with the paired transverse sealing machines F, F.

The transverse sealing machines F, F are of a known structure and are disposed for horizontal opening and closing motions below the bag forming cylinder D. That is, the transverse sealing machines reciprocate once for opening and closing after an intermittent operation of a delivery portion E, which is disposed in an opposed relation to an outer surface of the bag forming cylinder D. In the present embodiment, the transverse sealing machines F, F perform the opening and closing motions by a reciprocating motion of an air cylinder F1, which is connected to a crank F2.

A toggle lever 2 is integral or integrally projects from crank F2, and is pivotally moved vertically by the operation of the crank F2, and by a roller 2a which is rotatably disposed at a front end of toggle lever 2 and is brought into abutment with an upper surface of the base end side 1c of tension lever 1, and is thereby interlocked therewith, thus causing the base end side 1c of the tension lever to pivotally move vertically with the vertical pivotal movement of toggle lever 2.

A resilient member 3 (e.g., a spring) is disposed from the front end side (indicated at 1d) of tension lever 1 and extends downwardly to just under the front end side 1d to urge the base end side 1c of the tension lever upwards at all times into abutment with roller 2a, which is disposed at the front end of toggle lever 2.

Furthermore, a brake 4 for controlling the rotation of the web roll A is provided near the web roll A and is interlocked with the transverse sealing machines F, F.

In the present embodiment, a brake disk A2 is integrally mounted on a core shaft A1 of the web roll A. A brake lever 4a is disposed so as to be movable into contact with and away from brake disk A2. A brake 4, made of a material such as rubber, is fixed to brake lever 4a in opposed relation to the brake disk A2. An elongated hole 4b is formed in a base end of brake lever 4a and a pin 1e projects from the support shaft 1b of the tension lever 1 and engages hole 4b. As tension lever 1 pivotally moves vertically, brake lever 4a is moved so that only when tension roller 1a has reached its lower limit position, brake 4 is brought into pressure contact with brake disk A2 to stop the rotation of web roll A.

On the downstream side of the tension roller 1a in the deliver path C, a web bending portion 5 is provided to bend the web W which is being delivered. Side guides 6, 6 for abutment with both transverse side edges of web W project from the web bending portion 5 and are spaced from each other by a distance substantially equal to the width of web W.

Figure 3:
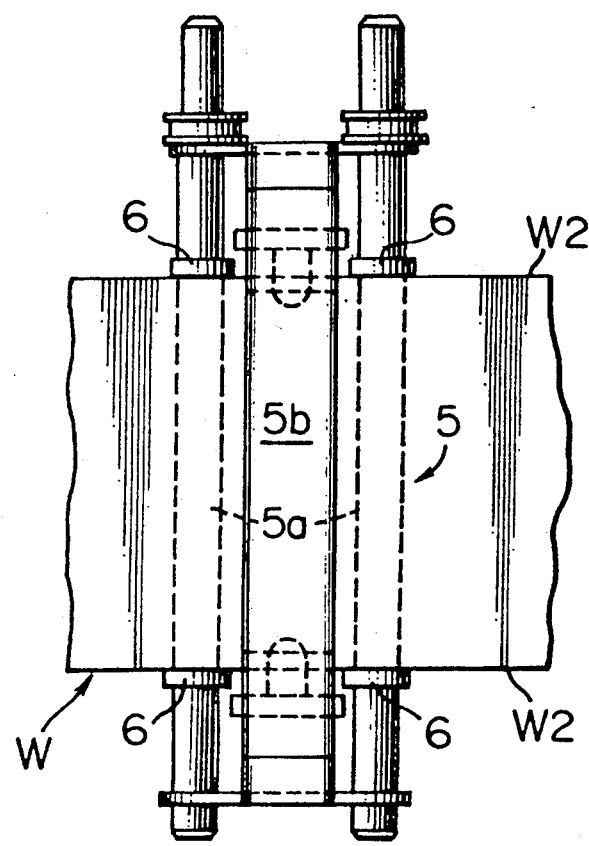
FIG. 3 is a partially enlarged plan view of a web bending portion.

In the present embodiment, web bending portion 5 comprises two round rods 5a, 5a, which are mounted transversely of the web and in parallel with each other. A square rod 5b is mounted between both round rods 5a and 5a transversely of the web. By passing web W through these rods, the web is bent generally in a U-shape and is thereby strengthened in the width direction. As shown in FIG. 3, guides 6 are annular and abut both transverse side edges W2, W2 of the web W. The guides project from the round rods 5a, 5a and have a diameter larger than the outside diameter of each round rod 5a. The annular guides 6 are movable to correspond with a change in width of web W.

A weight 7 rests on guide bar C2 and is vertically movably, if necessary. Weight 7 is utilized to impart a predetermined tension to the portion of web W, which is located on the downstream side of guide bar C2, and thereby prevents the web from becoming loose, even when the web is light in weight and therefore liable to become loose.

In the delivery portion E, a delivery belt 8 or a delivery roll is located opposite to the outer surface of bag forming cylinder D, with the web W being positioned therebetween in such a manner that delivery belt 8 comes into abutment with a transversely central part W1 of the web. In the present embodiment, delivery belt 8 is wound in the delivery direction, that is, in the vertical direction, along the transversely central part W1 of the web.

The operation of the bag forming/filling system constructed as described above will now be described.

First, as shown in FIG. 1, when the intermittent operation of delivery portion E is completed, and transverse sealing machines F, F are in a closed condition, toggle lever 2 moves upward, and the front end side of the tension lever 1 pivotally moves downward, that is, in the web stretching direction. Tension roller 1a reaches its lower limit position, whereby constant tension is applied to web W in delivery path C. At the same time, brake 4 comes into pressure contact with brake disk A2 on core shaft A1 of web roll A to stop the rotation of the web roll.

In this condition, when transverse sealing machines F, F start opening under the operation of air cylinder F1, toggle lever 2 moves downward and the base end side 1c of tension lever 1 pivotally moves downward, so that brake 4 moves away from core shaft A1 of web roll A, thus permitting the rotation of web roll A. At the same time, the front end side 1d of tension lever 1 pivotally moves upward, that is, in the direction opposite to the web stretching direction, and tension roller 1a moves upward.

Figure 4:
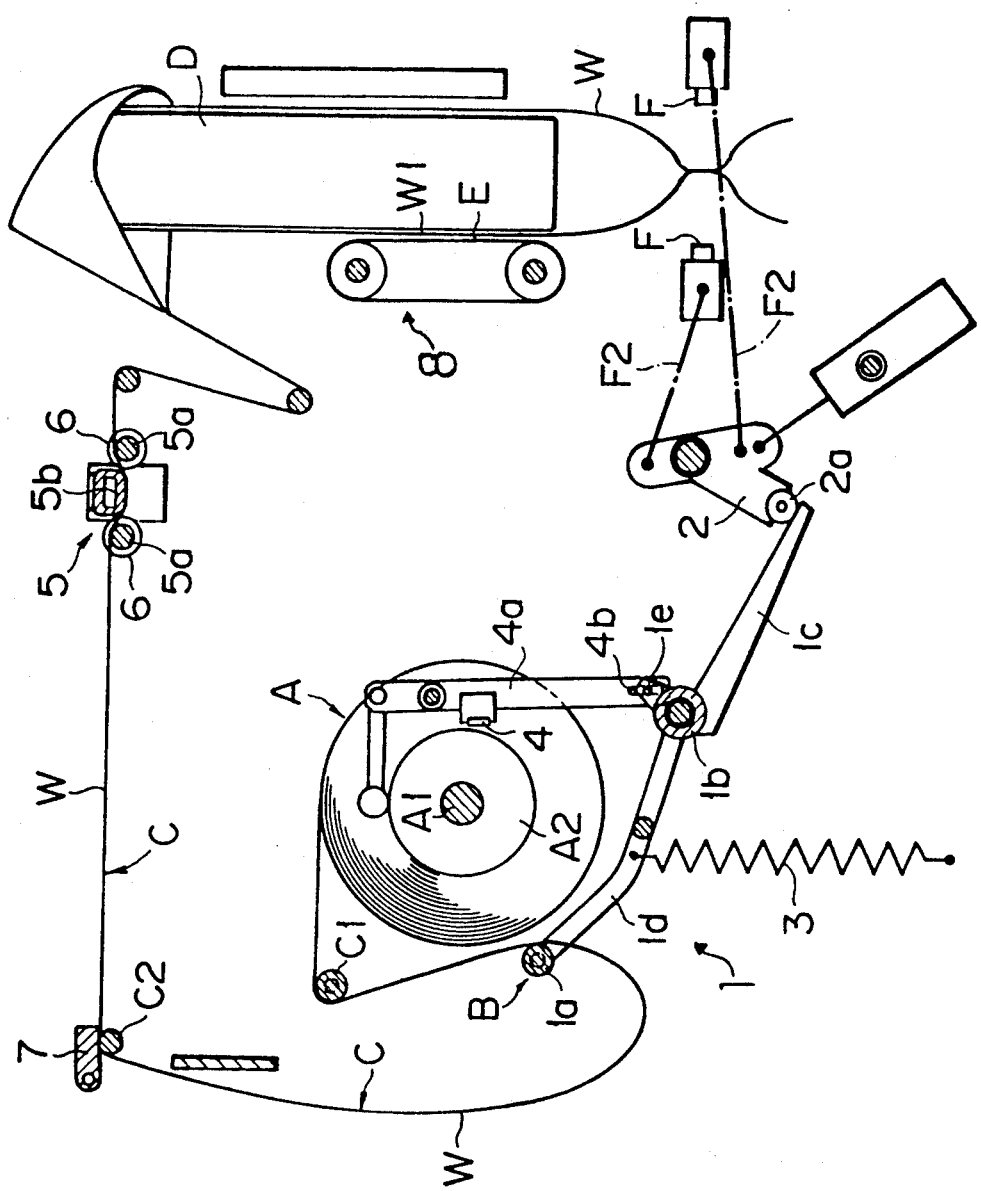
FIG. 4 is a front view in longitudinal section showing the opening motion of the transverse sealing machines.

As a result, as shown in FIG. 4, the portion of web W, which is positioned on the upstream side of guide bar C2 in the delivery path C, becomes less tense and more slack or loose, while the portion of web W, which is positioned on the downstream side of guide bar C2 is prevented by the weight 7 from becoming extremely loose.

Figure 5:
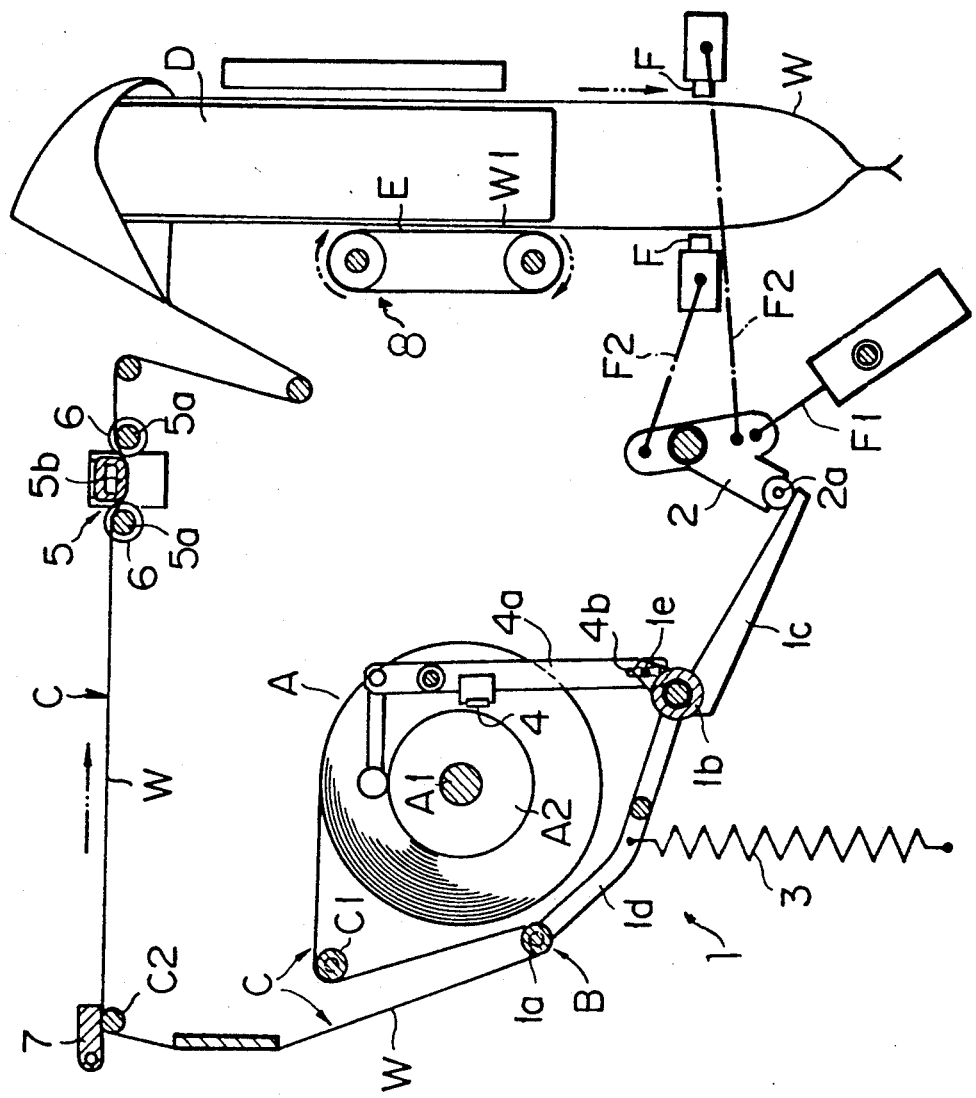
FIG. 5 is a front view in longitudinal section showing an intermittent operation of a delivery portion.

After completion of the opening motion of transverse sealing machines F, F, delivery portion E starts the intermittent operation and delivers the transversely central part W1 of web W downward by a predetermined length, whereby, as shown in FIG. 5, the slackened web W in delivery path C is delivered toward bag forming cylinder D and thus the slack of the web is gradually decreased.

Also, web W is bent by web bending portion 5 and so becomes stronger in the transverse direction. By abutment of both transverse side edges W2, W2 of the web with side guides 6 and because of small delivery resistance of the web, the web is guided by side guides 6. Even if a force is generated which causes the web W being delivered to move in the transverse direction (for example, due to a defective setting of a web roll A or a dimensional error of the web itself), the web is prevented from deviating and moving over side guides 6.

When the intermittent operation of delivery portion E is over and transverse sealing machines F, F start the closing motion under the operation of air cylinder F1, toggle lever 2 moves upward and the base end side 1c of tension lever 1 pivotally moves upward, so that the front end side 1d of tension lever 1 pivotally moves downward (that is, in the web stretching direction) and tension roller 1a moves downward. At the same time, brake 4 approaches core shaft A1 of web roll A.

As a result, web W, whose looseness or slack has been reduced, becomes more tense and the core shaft A1 of web roll A is rotated in the web pull-out direction, whereby web W is drawn out from web roll A by a required length, more specifically, a length substantially corresponding to the length of the web delivered by a single intermittent operation of delivery portion E. At substantially the same time that tension roller 1a reaches its lower limit position and the pull-out of the web W is completed, the closing motion of transverse sealing machines F, F is also completed, and again, as shown in FIG. 1, brake 4 comes into pressure contact with brake disk A2 of web roll A to stop the rotation of the web roll, so that web is not drawn out any further. Subsequently, the above-described operations are repeated.

In the present embodiment, as compared with known bag forming/filling systems, which require a drive source for the predelivery mechanism which is separate from the drive source for the delivery portion E and the transverse sealing machines F, F, the drive source for the predelivery mechanism B is the drive source for the transverse sealing machines F, F. Thus, any special drive source for predelivery mechanism B is not necessary, so that the structure can be made simpler and the cost reduced.

Figure 6:
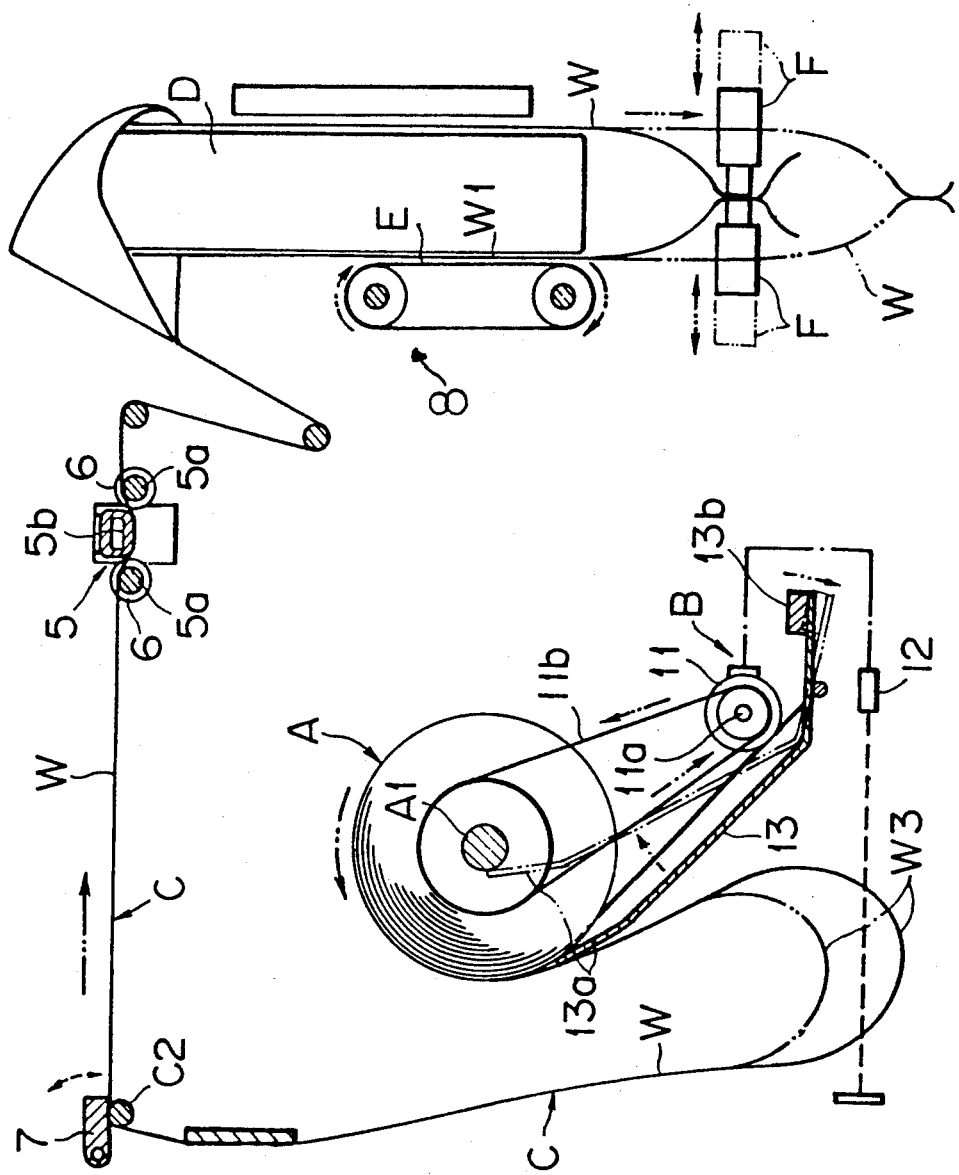
FIG. 6 is a front view in longitudinal section of a bag forming/filling system according to another embodiment of the present invention.

Referring now to FIG. 6, another embodiment of the present invention is illustrated, in which a predelivery mechanism B includes drive portion 11, which is interlocked with core shaft A1 of web roll A, and a detector 12 for detecting the slack length of web W which is unwound from web roll A. The web which is unwound from the web roll A is downwardly slackened in a U-shape, and then passes through guide bar C2, which is disposed in a position higher than web roll A, and horizontally toward the upper portion of bag forming cylinder D, thereby forming a delivery path C.

Drive portion 11 includes a motor, for example, having an output shaft 11a thereof being connected to core shaft A1 of web roll A through transmission member 11b, such as a belt or a chain, or is connected directly to core shaft A1. Web roll A is rotated in the web unwinding direction in accordance with a drive signal provided from detector 12, and upon the stop of input of the drive signal, the rotation of web roll A is stopped.

Detector 12, which includes a photo sensor, for example, is in electrical communication with drive portion 11 and detects a lower end position W3 of web W, which is in a downwardly slackened condition in a U-shape. When the lower end position W3 of the web shifts to a position higher than a preset position by an intermittent operation of a delivery portion E, detector 12 outputs a drive signal to the drive portion 11. When the web lower end position W3 shifts to a position lower than the preset position, detector 12 stops the output of the drive signal for the drive portion 11.

The preset position indicates the lower end position W3 of the U-shaped slackened web W when it is unwound from web roll A into delivery path C by a length substantially corresponding to the length of the web delivered by a single intermittent operation of delivery portion E.

A rewinding preventing element 13 is provided adjacent the web roll for preventing contact of a portion of web W unwound from web roll A with the outer peripheral surface of the web roll.

In this embodiment, rewinding preventing element 13 includes a rocking plate which is rockably supported in contacting and non-contacting directions with respect to web roll A in opposed relation to the outer peripheral surface of the web roll. Front end 13a of the rocking plate is inserted between unwound web W and the outer peripheral surface of web roll A, and weight 13b is fixed to a base end of the rocking plate. Front end 13a of the rocking plate is kept in abutment with the outer peripheral surface of the web roll A by the weight 13b.

Other elements of this embodiment, including web bending portion 5, delivery portion E and transverse sealing machines F, F, which are not referred to above are substantially the same as described in the embodiment of FIGS. 1–5.

The following describes operation of the bag forming/filling system as illustrated in FIG. 6.

First, the operation of drive portion 11 is controlled by detector 12, and web W is unwound from web roll A by a length substantially corresponding to the length of the web delivered by a single intermittent operation of delivery portion E and assumes a U-shaped slackened condition.

In this condition, when the opening motion of transverse sealing machines F, F is completed, delivery portion E starts an intermittent operation, and web W is delivered by a predetermined length. The web which is loose in delivery path C is delivered toward bag forming cylinder D, so that the looseness or slack of the web is gradually decreased and the lower end position W3 of the U-shaped slackened web shifts upward.

When lower end position W3 of the U-shaped slackened W shifts to a position higher than the preset position, drive portion 11 operates in accordance with the output of detector 12 and causes core shaft A1 of web roll A to rotate in the unwinding direction, whereby web W is unwound from web roll A and its lower end position W3 shifts to a position lower than the preset position, whereupon the operation of drive portion 11 stops.

However, if the portion of web W, which is unwound from web roll A, contacts the outer peripheral surface of web roll A, it may be rewound on web roll A in the web unwinding direction of the web roll upon rotation of web roll. But there is no such likelihood because the rewinding preventing element 13 is present to prevent such rewinding as illustrated in FIG. 6.

In the bag forming/filling system illustrated in FIG. 6, therefore, web W is unwound from the web roll A independently of the opening and closing motions of transverse sealing machines F, F, and even if the opening/closing speed of sealing machines, F, F is increased to increase the processing speed, noise will not be generated.

Although in the previously described embodiments, tension lever 1 of predelivery mechanism B is disposed vertically and pivotally below web roll A, the position of tension lever 1 is not so limited. Tension lever 1 may be located anywhere in the vicinity of web roll A. The shape of delivery path C and the structures of brake 4 and web bending portion 5 are also not limited to those described above. Other structures may be used if only the respective functions described above are attained.

Furthermore, the rewinding preventing element 13 need not only be a rocking plate. For example, a U-shaped slackened web W may be sucked downward, or air or the like may be blown towards the portion of web W which has been unwound from the web roll A, in a direction away from web roll A, or the portion of web W which is unwound from web roll A may be conducted in a direction away from the web roll and then loosened in a U-shape. Also, other elements such as a spring, can be used instead of weight 13b, to keep the rocking plate in abutment with web roll A.

The following advantages are present in the present invention as described above.

With the operation of the predelivery mechanism, the web in the delivery path is loosened by a length substantially corresponding to the delivery length of the delivery portion at the, time of the start of the intermittent operation of the delivery portion. The slackened web is delivered toward the bag forming cylinder by the subsequent intermittent operation of the delivery portion, so it is possible to intermittently deliver the web in a condition of low web tension.

Therefore, as compared with known bag forming-/filling systems, wherein a web portion which is kept under constant tension is intermittently delivered by a delivery portion, the web delivery resistance is low and the delivery force of the delivery portion can be reduced, thus leading to reduction in the cost. Furthermore, even if a force is generated which causes the web being delivered to move its width direction transverse to the web delivery direction, for example, due to a defective setting of the web roll or due to a dimensional error of the web itself, since the deliver resistance is low, the function of the projecting side guides prevent positional deviation of the web so that the web cannot easily move over the side guides. As a result, there will be no defective products and it is not necessary to stop the operation for adjustment of the web, that is, adjusting operations can be omitted, and operating efficiency can be improved.

Since the transversely central part of the web is delivered by a single delivery portion, both transverse side portions of the web are equally delivered in a noncontact manner, so the web can be delivered without alternate slipping of both transverse side portions of the web.

Therefore, as compared with known bag forming-/filling systems wherein two delivery portions operate at the same speed to deliver both transverse side portions of the web by the same length at a time, it is possible to prevent meandering of the web and hence prevent the occurrence of defective products even when the surface of the delivery portion is stained or there is a difference in quality, for example. Thus, it is not necessary to stop the operation of the system to correct meandering of the web, so that not only the adjustment operations can be omitted, but also the operating efficiency is improved.

The present disclosure relates to subject matter contained in Japanese Patent Application Nos. 3-190,029 and 3-293,359 (filed Jul. 30, 1991 and Nov. 8, 1991, respectively), which are herein incorporated by reference in their entireties.

Although the invention has been described with reference to particular means, materials and embodiments, it is to be understood that the invention is not limited to the particulars disclosed and extends to all equivalents within the scope of the claims.

What is claimed is:

1. A method for forming a bag, wherein a predetermined length of web fed from a web roll is fed by a delivery mechanism to a bag forming cylinder where the web is sealed by a sealing machine to from a bag, said sealing machine having an opening motion and a closing motion, said method comprising the steps of:

unwinding and loosening a portion of the web from said web roll by a length substantially corresponding to said predetermined length of a web fed from the web roll by the delivery mechanism to the bag forming cylinder;

feeding said predetermined length of web to the bag forming cylinder by said delivery mechanism after said unwinding of said portion of said web;

sealing said web by a closing motion of said sealing machine at a predetermined time;

said unwinding and loosening step including providing a pivotally movable tension lever, and moving said tension lever in a first direction to unwind the web in a web unwinding direction to place said portion of the web under tension and to rotate said web roll in an unwinding direction at substantially the same time as the closing motion of said sealing machine, and moving said tension lever in a second direction opposite to said first direction to loosen said portion of the web at substantially the same time as an opening motion of said sealing machine; and providing a guide bar located in a delivery path between said predelivery mechanism and said bag forming cylinder, resting a weight on said guide bar, said weight and guide bar imparting a predetermined tension to a portion of said web on a downstream side of said guide bar and allowing the web to be loosened on an upstream side of said guide bar when said tension lever is moved in said second direction.

2. A method for forming a bag according to claim 1, comprising stopping rotation of said web roll, upon completion of said closing motion of said sealing machine.

3. A bag forming/filling system, wherein a predetermined length of web fed from a web roll is fed by a delivery mechanism to a bag forming cylinder, the web being sealed by a sealing machine to form a bag, said bag forming/filling system comprising:

a predelivery mechanism for unwinding and loosening a portion of the web from said web roll by a length substantially corresponding to said predetermined length of web fed from the web roll by the delivery mechanism to the bag forming cylinder, said predelivery mechanism comprising means for unwinding and loosening said portion of the web in a web unwinding direction before operation of said delivery mechanism;

said web being sealed by a closing motion of said sealing machine at a predetermined time;

said predelivery mechanism including a pivotally movable tension lever, said tension lever being pivotally movable in a first direction means for moving said tension lever in said lever in said first direction for unwinding said web in said web unwinding direction to place said portion of the web under tension and to rotate said web roll in an unwinding direction at substantially the same time as the closing motion of said sealing machine and, said tension lever being pivotally movable in a second direction opposite to said first direction to loosen said portion of the web substantially during an opening motion of said sealing machine;

a delivery path between said predelivery mechanism and said bag forming cylinder, a guide bar located in said delivery path, and a weight adapted to rest on said guide bar, said weight and guide bar impairing a predetermined tension to a portion of said web on a downstream side of said guide bar and allowing the web to be loosened on an upstream side of said guide bar when said tension lever is moved in said second direction; and a brake for stopping rotation of said web roll, said brake being operably connected to said sealing machine, whereby said brake stops rotation of said web roll when said closing motion of said sealing machine is completed.

4. A bag forming/filling system according to claim 3, wherein said delivery mechanism is located adjacent to said bag forming cylinder and is intermittently operable to feed said predetermined length of web from said web roll to the bag forming cylinder, said predetermined length of web passing between said delivery mechanism and said bag forming cylinder.

5. A bag forming/filling system according to claim 1, wherein said tension lever is operably connected to said sealing machine, wherein said tension lever is pivotally movably during said opening and closing motions of said sealing machine.

6. A bag forming/filling system according to claim 1, comprising a web bending element located in said delivery path.

7. A bag forming/filling system according to claim 6, wherein the web includes opposed transverse side edges, said web bending element including guide means for contacting both transverse side edges of said web.

* * * * *

UNITED STATES PATENT AND TRADEMARK OFFICE
CERTIFICATE OF CORRECTION

PATENT NO. : 5,317,858
DATED : June 7, 1994
INVENTOR(S) : Kuniyoshi HANAI

It is certified that error appears in the above-indentified patent and that said Letters Patent is hereby corrected as shown below:

Column 9, line 33 of the printed patent, change "the, time" to ----the time---.
Column 11, line 24 (claim 3, line 34) change "impairing" to ---imparting---.
Column 12, line 15 (claim 5, line 1) change "claim 1" to ---claim 3---.
Column 12, line 20 (claim 6, line 1) change "claim 1" to ---claim 3---.

Signed and Sealed this

Fourteenth Day of March, 1995

*Attest:*

BRUCE LEHMAN

*Attesting Officer*   *Commissioner of Patents and Trademarks*